United States Patent Office 2,704,920
Patented Mar. 29, 1955

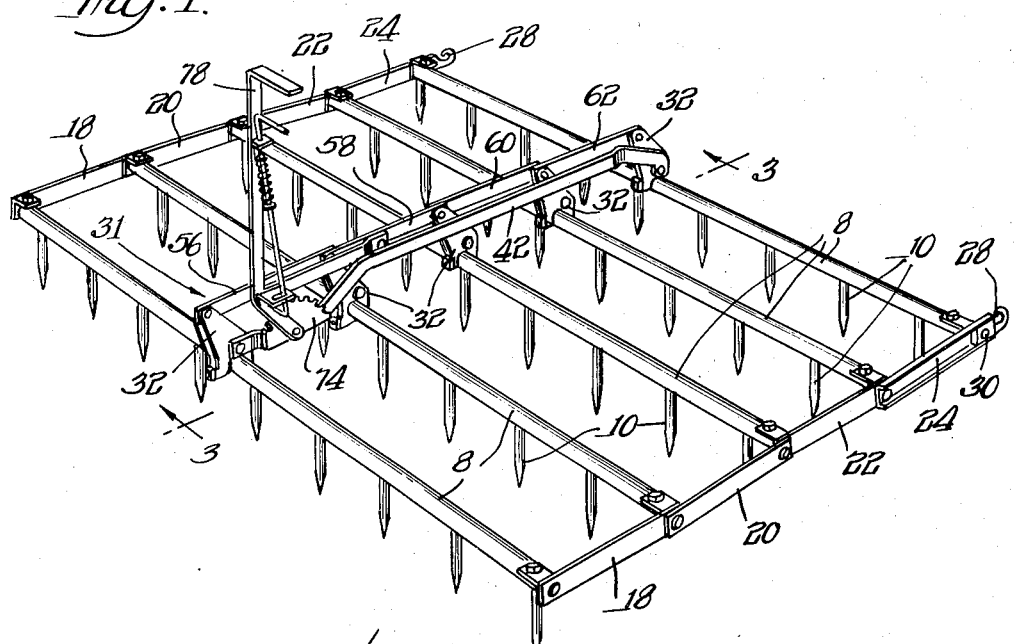

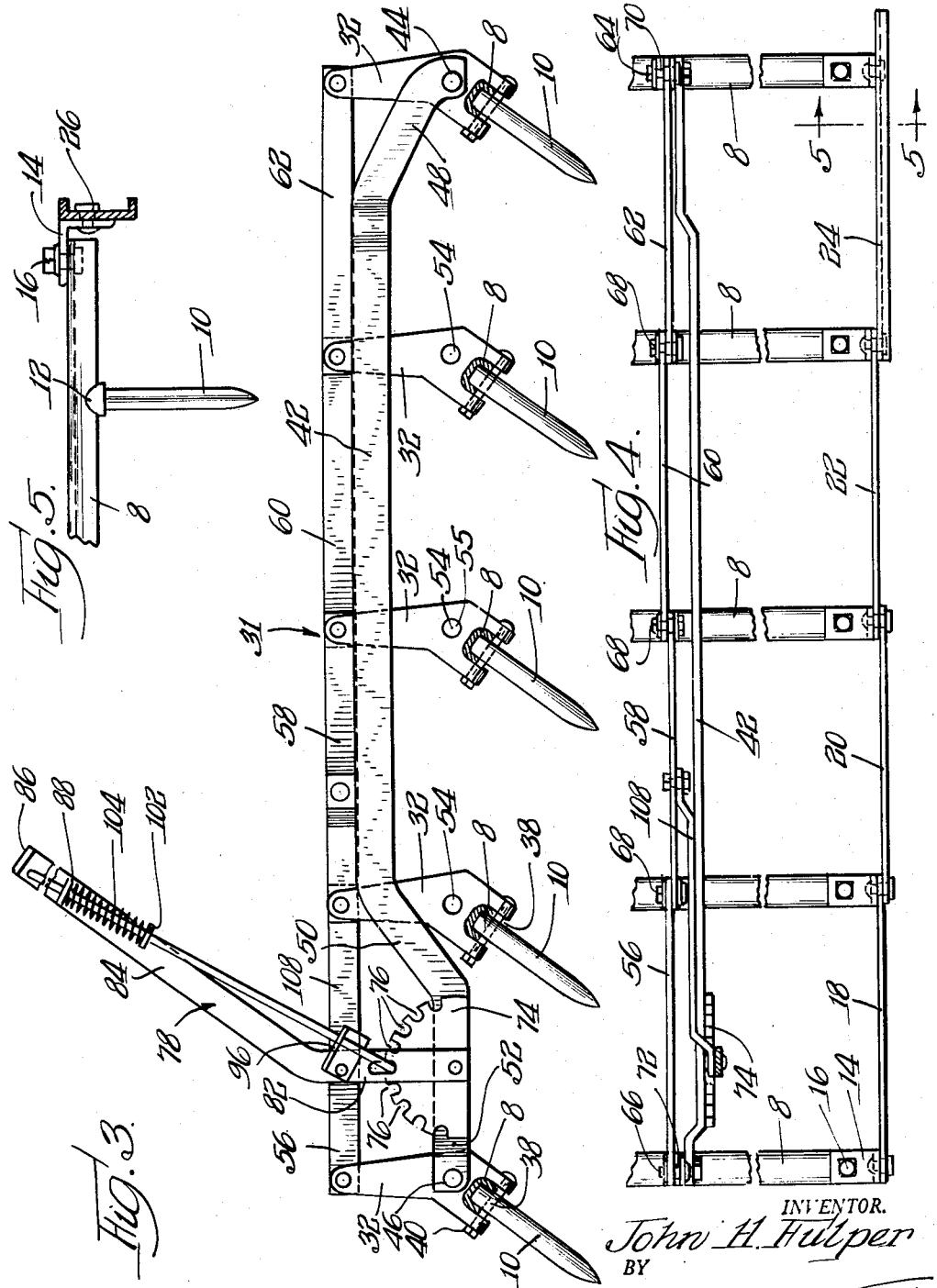

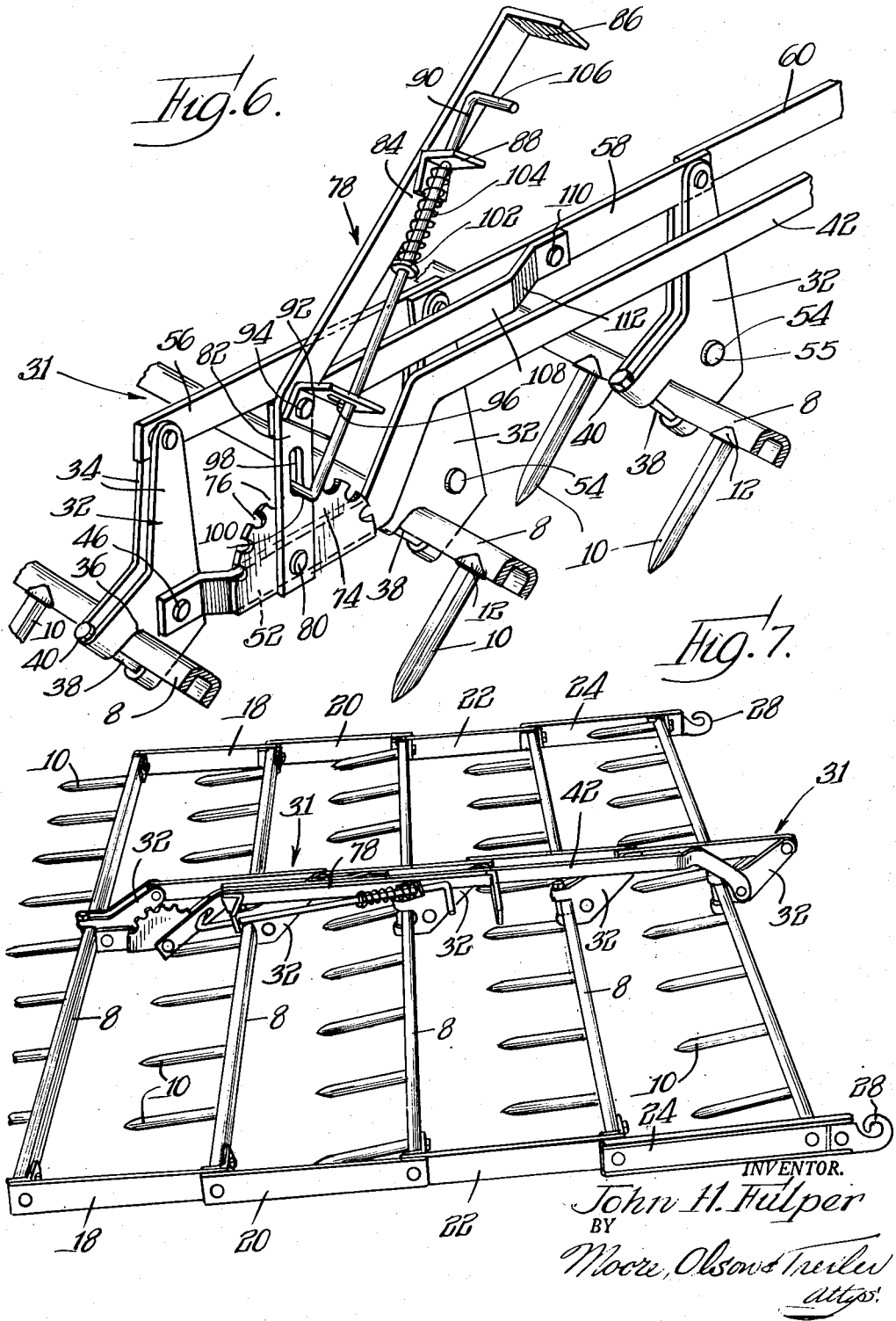

2,704,920

HARROW

John H. Fulper, Kewanee, Ill., assignor to Kewanee Machinery & Conveyor Company, Kewanee, Ill., a corporation of Illinois Application May 24, 1950, Serial No. 163,852

5 Claims. (Cl. 55—76)

This invention is concerned generally with a harrow and more particularly with a harrow adapted for use on rough or trash covered ground and adapted for more ready transportation than harrows heretofore known.

Spike toothed harrows are used to break and loosen up soil in the cultivation of farm lands. Often harrows are used in fields in which there is a considerable quantity of litter or trash such as fallen corn stalks or roots. Prior harrows have picked up a large quantity of such trash and have further tended to pick up clods of earth clinging thereto. This invention contemplates the provision of a harrow which is singularly free from projections on which trash or other objects could catch and is flexible so that each tooth bar can move up and down relative to other teeth in order that the harrow will to a large degree clean itself of litter or trash. The teeth are progressively adjustable from vertical to horizontal position so that they may be set at an angle with the ground which is most compatible with the character of the earth being harrowed to provide sufficient harrowing action while picking up little or no litter or debris.

An object of this invention is the provision of a toothed harrow which is substantially self cleaning and adapted to accumulate a minimum of trash.

It is common practice to provide harrow sections of about 5 or 6 feet in width. In order to speed harrowing a number of harrow sections, often four, are connected in parallel behind a tractor. The parallel connected harrow sections are maintained in proper alignment by an evener and the number of such sections depends on the character and extent of ground to be tilled and upon the capacity of the tractor pulling the harrow. It is apparent that few if any farm gates are sufficiently wide to accommodate more than one or two harrow sections at a time. As one or more gates nearly always must be traversed with a harrow between the barn or storage shed and the field to be tilled, it is apparent that the process of moving harrow sections from the barn or storage shed to the field is most tedious.

This invention contemplates the provision of a harrow or harrow section in which the harrow teeth can be moved into horizontal position for transportation of the harrow with the teeth clear of the ground. The position of the harrow teeth is determined by a lever assembly operating through a plurality of connecting links. The connecting lever and links are constructed to lie flat against the top of the harrow section when the teeth are in horizontal position so that one harrow section may be folded over upon another for movement through gates or other confined areas without having levers and links of adjacent sections interfere with one another. By folding the sections upon one another it is possible to reduce the total harrow width materially so that it is not necessary to disconnect sections for movement through gates or other restricted passageways.

An object of the invention is to provide a spike toothed harrow of the flexible type composed of a plurality of articulated tooth bars each carrying a plurality of spikes and wherein a tooth bar adjusting means is connected by a detachable mechanism to each tooth bar, together with an actuatable means for simultaneously angularly positioning all of the spikes of the various tooth bars with respect to the ground, said latter mechanism including a rigidifying member interconnecting the foremost and rearmost tooth bar shifting mechanism in a manner which permits such tooth bar shifting mechanism to be easily and quickly detached from all of the tooth bars of the harrow while at the same time providing a construction which combines the advantages of a flexible multi-section harrow while at the same time providing sufficient rigidity to the harrow during use and permitting the toothed bar shifting mechanism to collapse compactly to the harrow.

Another object of the invention is to provide a harrow collapsible into a minimum vertical height for transportation, shipping and storage.

An object of the present invention is to provide a harrow construction having a plurality of pivotally interconnected tooth bars each carrying a plurality of teeth, and wherein tooth bar actuating means is rigidly yet detachably connected to each tooth bar and to a common actuating means whereby all of said tooth bars may be simultaneously adjusted and wherein means is provided for maintaining the foremost and rearmost tooth bars in substantially predetermined spaced relation which last mentioned means is pivotally connected to the detachable actuating means of the foremost and rearmost tooth bars only, whereby the tooth bar actuating means and the spacing means for the foremost and rearmost tooth bars may be simultaneously removed merely by detaching the tooth bar actuating means from each tooth bar.

A further object of the invention is to provide a toothed type of harrow which is collapsible into a minimum of space for shipping and storage, and which construction eliminates the necessity of the customary practice of disassembling or knocking down the old style types of harrows for shipping and storage.

This invention contemplates the provision of a flexible harrow and a cooperating lever or positioning assembly for determining the angular position of the tooth bars and teeth of the harrows. The positioning assembly includes rocker arms positionable over the tooth bars of the harrow and securable thereto by one nut and bolt for each tooth bar, it being unnecessary to provide the tooth bars with any apertures for this purpose. Thus the lever assembly and harrow readily may be assembled by the owner by the simple insertion of one nut and bolt for each tooth bar. After several years of hard use the leading edges of the teeth will become dulled and by simply disconnecting the lever assembly and side link assemblies and reconnecting them in reversed position a harrow can be operated reversely with the original sharp rear edges of the teeth biting into the earth.

An object of this invention is the provision of a harrow having angularly adjustable tooth bars and a lever assembly connectable to said tooth bars by a single releasable connection for each tooth bar with the connection lying entirely externally of each tooth bar.

A further object of this invention is the provision of a harrow and lever assembly as set forth in the last foregoing object wherein the lever assembly may be connected to the harrow either forwardly or reversely.

Other and further objects and advantages of the present invention will be apparent from the following description when taken in connection with the accompanying drawings, in which:

Figure 1 is a perspective view of a harrow embodying my invention;

Figure 2 is a view similar to Figure 1 showing the harrow in flexed position;

Figure 3 is a longitudinal sectional view taken substantially along the line 3—3 of Figure 1;

Figure 4 is a fragmentary top view of the harrow;

Figure 5 is a cross sectional view taken substantially along the line 5—5 of Figure 4;

Figure 6 is a perspective view showing details of the lever assembly for determining the angular position of the teeth; and Figure 7 is a perspective view similar to Figure 1 showing the harrow in completely collapsed position.

In the particular form of the invention shown there is provided a number of transverse U-shaped tooth bars 8 each carrying a plurality of substantially dagger shaped harrow teeth 10. Each tooth is arranged with the widest dimension of its cross section transversely of its supporting tooth bar and is welded thereto internally of the bar with the weld extending partly on the outside of the bar as shown at 12, for increased strength and to fair the tooth surfaces to the joining tooth bar surfaces, to prevent snagging of litter or trash on the junction.

Each tooth bar 8 is provided at each end with a pivotal connection as shown in Fig. 5 comprising an angle 14 secured to the web of the tooth bar by means such as a rivet or nut and bolt 16. Pivotally mounted pairs of side links 18, 20 and 22 and a pair of side channels 24 join the tooth bars 8 by means of rivets or pins 26 extending through the depending flanges of angles 14 and through the ends of side bars 18, 20 and 22 and side channel 24. Due to the pivotally mounted links interconnecting the tooth bars it is possible for individual bars to rise and drop relative to other bars as shown in Figure 2 to till uneven ground and by substantially vertical shaking movement remove any litter or trash that might be picked up. The connection is sufficiently flexible that one end of a tooth bar may move up or down relative to the other end. The harrow or harrow section shown is drawn directly behind a tractor, plow, or disk, or other farm implement, or is connected to an evener by means of hooks 28 secured by means such as bolts or rivets 30 to the webs of channels 24. The teeth 10 are symmetrical and are sharpened on their trailing edges as well as their leading edges. After many years of hard usage the leading edges of the teeth will become dulled. It is apparent that the harrow can be reversed in operation to cause the sharpened rear edges of the teeth to advance into the soil if some means is provided for controlling the angular position of the teeth from vertical to horizontal in either direction. Such means comprises the lever assembly 31 shown particularly in Figures 3 and 6.

One rocker arm 32 is connected to each tooth bar 8 intermediate the ends thereof with all of the rocker arms being in longitudinal alignment. Each rocker arm is bifurcated to provide a pair of upstanding arms 34. A U-shaped slot 36 complementary to the tooth bars 8 is provided at the bottom of each rocker arm. Each rocker arm 32 is held on its tooth bar by a bolt 38 carried between the arms 34 and beneath the tooth bar 8. The bolt 38 is locked in position by a nut 40. The front and rear rocker arms 32 are pivotally connected to a rigid longitudinal strut 42 which prevents longitudinal collapse of the harrow by means such as rivets or pins 44 and 46, respectively. The longitudinal strut 42 is straight and substantially horizontal through the greater portion of its length and is provided at its forward end with a curved or angularly disposed depending arm 48 carrying the pivotal connection 44. Adjacent the next to the last tooth bar the strut 42 is provided with a depending offset 50 so that the rear horizontally extending strut portion 52 may be substantially on a level with the lower end of the arm 48. Apertures 54 are seen in the rocker arms positioned similarly to the pins 44 and 46 because commercially it is most practical to form all of the rocker arms identical, preferably stamping them from sheet metal and folding them to present the bifurcated structure shown. A spacing rivet such as 55 is inserted in each one of the apertures 54 to hold arms 32 and 34 in spaced relation and further to increase the rigidity of the harrow.

The rocker arms are interconnected at their upper ends by a series of links 56, 58, 60 and 62 pivotally secured in overlapping relation between the arms 34 of the bifurcated rocker arms 32 by means of front and rear pins or rivets 64 and 66 respectively and by intermediate rivets or pins 68. It will be noted that the front and rear rivets have been referred to separately from the intermediate rivets as it is necessary to use shorter spacer rivets 70 and 72 to pull the arms in closer spaced relation to keep the links 56 and 62 from rattling back and forth between the upstanding arms on the pins or rivets 68 due to the overlapping of the links.

A semicircular segment 74 is rigidly secured to the lower horizontally extending portion 52 of the longitudinal strut 42 by means such as welding. The segment is provided around a part of its periphery with a series of notches 76. An operating lever 78 is pivotally connected as by a rivet or pin 80 to the strut 42 and the segment 74 at the center of curvature of said segment. The operating lever 78 is angled near its end to provide a portion 82 substantially radial of the segment 74 and hereinafter called the radial portion of the lever. The outer portion 84 of the lever has a transversely arranged section at its outer end forming a handle 86. A mounting bracket 88 is secured to the outer portion 84 of the lever 76 as by riveting or welding and is apertured to receive a locking bar 90. A locating angle bracket 92 is secured as by rivet 94 substantially at the junction between the radial and outer portions of the lever 78 and is slotted as at 96 to accommodate the shank of the locking bar 90. The radial portion 82 of the operating lever is longitudinally slotted at 98 to accommodate a transverse locking finger 100 on the locking bar 90. The lower end of the slot 98 is arranged substantially to coincide with the innermost edge of any of the notches 76. The locking bar 90 is provided with a collar 102 spaced below the bracket 88 and a compression spring 104 spaced between the collar and bracket normally urges the finger 100 to the bottom of the slot 98 where it fits into one of the notches 76 to lock the angular position of the operating lever relative to the segment 74. The upper end of the locking bar 90 is transversely arranged to form a locking bar handle 106 substantially parallel to the lever handle 86 so that the two handles may be squeezed in one hand to raise the finger 100 in the slot 98 to unlock the lever 84.

A lever link 108 is pivotally connected to the operating lever 78 adjacent the outer extremity of the radial portion thereof and is pivotally connected at its other end as by a pin or rivet 110 to the rocker arm connecting link 58. The lever link 108 is provided near the pivot 110 with an offset 112 in order to provide clearance for the adjacent rocker arm 32.

The angular position of the teeth 10 is determined by the position of the operating lever 78 relative to the segment 74. As each tooth bar 8 is pivotal, it is apparent that movement of the upper ends of the rocker arms 32 caused by reciprocation of the links 56, 58, 60 and 62 brought about in turn by rotation of the operating lever 78 and consequent reciprocation of the lever link 108 will move the tooth bars in an arc to position the teeth at any desired angle relative to the ground. When the teeth are positioned substantially horizontal as shown in Figure 7, for transportation, storage, or folding of sections one upon the other, the operating lever and interconnecting links lie substantially flat against the tops of the tooth bars 8, this being possible due to the angular construction of the operating lever 78 and the rocker arms 32.

As the entire structure determining the angular position of the teeth 10 is secured to the tooth bars 8 only by the bolts 38 and nuts 40 it is apparent that this structure can be removed from the tooth bars by the simple expedient of removing these few bolts, five as shown in the drawings. The lever assembly 31 consequently can be reversed relative to the remainder of the harrow and is easily reconnected by reinsertion of the bolts 38 so that the harrow can be operated reversely with the original sharp rear edges of the teeth now biting into the earth.

For storage periods or for transportation from one location to another, on the farm, the positioning assembly can be folded flat against the top of the harrow so that one harrow section may be folded atop another to occupy less transverse space. The harrow has few projections to snag trash and debris and the up and down motion of the tooth bars due to its flexibility makes the harrow substantially self-cleaning.

Although a particular embodiment of my invention has been shown and described, it is apparent that this is for illustrative purposes only and my invention is to include all that which fairly falls within the spirit and scope of the appended claims.

I claim:

1. A harrow comprising a plurality of tooth bars arranged in substantial parallelism, a plurality of teeth arranged along each of said bars, a plurality of side links interconnecting adjacent bars at the ends thereof and pivotally connected to the associated bars and to adjacent links, a rocker arm attached to each of said bars intermediate the ends thereof and extending upwardly therefrom, a rigid strut pivotally connected to the rocker arms that are positioned on the foremost and rearmost tooth bars, the pivot connection between said strut and said arms being spaced away from said tooth bars, rocker arm links interconnecting each pair of rocker arms and pivotally connected to the associated rocker arms and to adjacent rocker arm links, and a multi-position lever mounted on said strut and connected to one of said rocker arm links.

2. A harrow comprising a plurality of tooth bars arranged in substantial parallelism, a plurality of teeth arranged along each of said bars, a plurality of side links interconnecting adjacent bars at the ends thereof and pivotally connected to the associated bars and to adjacent links, a rocker arm attached to each of said bars intermediate the ends thereof and extending upwardly therefrom, a rigid strut pivotally connected to the rocker arms that are positioned on the foremost and rearmost tooth bars, the pivot connection between said strut and said arms being spaced away from said tooth bars, rocker arm links interconnecting each pair of rocker arms and pivotally connected to the associated rocker arms and to adjacent rocker arm links, and a multi-position lever mounted on said strut between the rearmost tooth bar and the tooth bar adjacent to the rearmost tooth bar, said lever being connected to the rocker arm link intermediate the ends thereof which extends between the rocker arm attached to the tooth bar adjacent the rearmost tooth bar and the rocker arm attached to the tooth bar positioned adjacent said last mentioned tooth bar and forward with respect thereto.

3. A harrow comprising a plurality of tooth bars arranged in substantial parallelism, a plurality of teeth arranged along each of said tooth bars, a bracket pivotally attached to each end of each of said bars, a plurality of side links interconnecting the brackets on adjacent bars at each end of the bars, said side links being pivotally connected to the associated brackets and to adjacent links, a rocker arm attached to each of said bars intermediate the ends thereof and extending upwardly therefrom, a rigid strut pivotally connected to the rocker arms on the foremost and rearmost tooth bars, the point of connection between said strut and said arms being spaced away from said tooth bars, rocker arm links interconnecting each pair of rocker arms and pivotally connected to the associated rocker arms and to adjacent rocker arm links, and a multi-position lever mounted on said strut and connected to one of said rocker arm links.

4. A harrow comprising a plurality of tooth bars having a channel-shaped cross section including a bight portion and a pair of substantially parallel flanges, said tooth bars being arranged in substantial parallelism, a plurality of teeth mounted in said channel-shaped bars with the axis of the teeth disposed substantially perpendicular to the plane of said bight position, a plurality of side links interconnecting adjacent bars at the ends thereof and pivotally connected to the associated bars and to adjacent links, a substantially U-shaped rocker arm for each of said tooth bars including a bight portion and a pair of substantially parallel leg portions, each of said rocker arms having a channel-shaped slot formed in the bight portion thereof to receive the bight portion of a tooth bar, said channel-shaped slot having a depth greater than the depth of said tooth bars so that the bight portion of said rocker arm extends beyond an associated bar when the bar is in assembled position, a bolt passing through the bight portion of each rocker arm to hold the associated tooth bar in operative position, a rigid strut pivotally connected to the rocker arms on the foremost and rearmost tooth bars, and a lever assembly mounted on said strut and linked to each rocker arm for varying the angularity of the teeth with respect to the ground when the harrow is in operative position.

5. A harrow comprising a plurality of tooth bars having a channel-shaped cross section including a bight portion and a pair of substantially parallel flanges, said tooth bars being arranged in substantial parallelism, a plurality of teeth mounted in said channel-shaped bars with the axis of the teeth disposed substantially perpendicular to the plane of said bight position, a plurality of side links interconnecting adjacent bars at the ends thereof and pivotally connected to the associated bars and to adjacent links, a substantially U-shaped rocker arm for each of said tooth bars including a bight portion and a pair of substantially parallel leg portions, each of said rocker arms having a channel-shaped slot formed in the bight portion thereof to receive the bight portion of a tooth bar, said channel-shaped slot having a depth greater than the depth of said tooth bars so that the bight portion of said rocker arm extends beyond an associated bar when the bar is in assembled position, a bolt passing through the bight portion of each rocker arm to hold the associated tooth bar in operative position, a rigid strut pivotally connected to the rocker arms on the foremost and rearmost tooth bars, the point of connection between said strut and said rocker arms being spaced away from said tooth bars, rocker arm links interconnecting each pair of rocker arms and pivotally connected to the associated rocker arms and to adjacent rocker arm links, and a multi-position lever mounted on said strut and connected to one of said rocker arm links to vary the angularity of said teeth with respect to the ground when the harrow is in operative position.

References Cited in the file of this patent

UNITED STATES PATENTS

| Number | Name | Date |
|---|---|---|
| 264,183 | Mewhinney | Sept. 12, 1882 |
| 929,160 | Nestestu | July 27, 1909 |
| 2,005,044 | Muntzel | June 18, 1935 |
| 2,177,570 | Juliot | Oct. 24, 1939 |
| 2,317,537 | Kovar | Apr. 27, 1943 |
| 2,320,000 | Juliot | May 25, 1943 |
| 2,327,236 | Antal | Aug. 17, 1943 |